Figure 1:
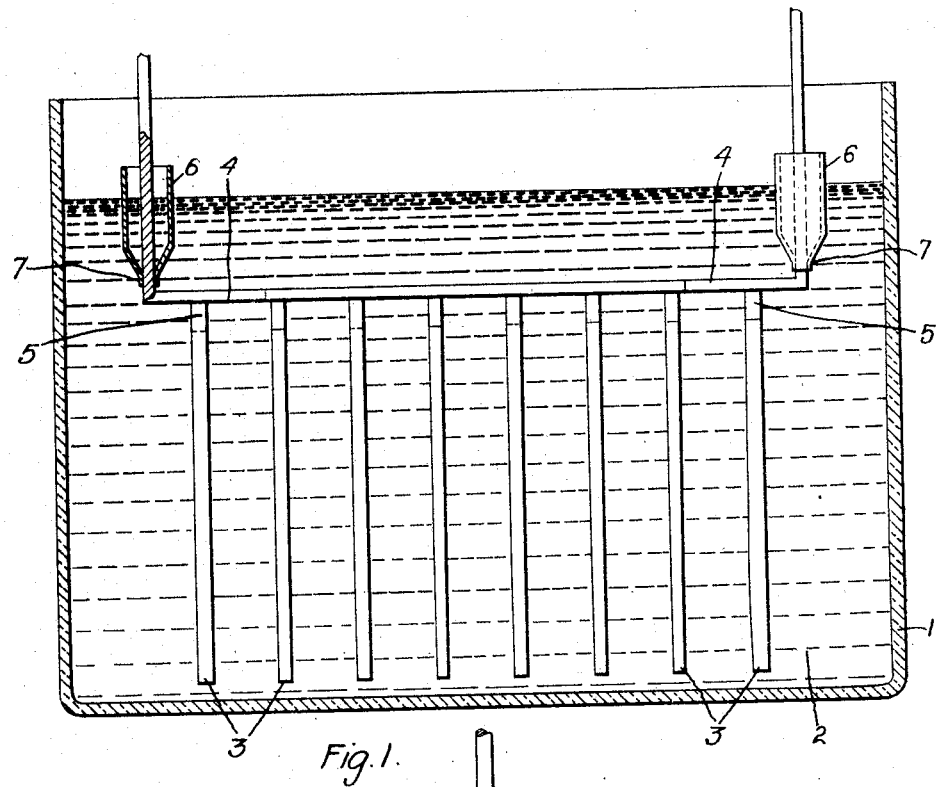

C. LE G. FORTESCUE.
TERMINAL FOR ELECTROLYTIC CONDENSERS.
APPLICATION FILED JAN. 16, 1919.

1,382,899.

Patented June 28, 1921.

WITNESSES:

INVENTOR
Charles LeG. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

TERMINAL FOR ELECTROLYTIC CONDENSERS.

1,382,899.     Specification of Letters Patent.     Patented June 28, 1921.

Application filed January 16, 1919. Serial No. 271,462.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Terminals for Electrolytic Condensers, of which the following is a specification.

My invention relates to terminals for electrodes of electrolytic condensers, lightning arresters, rectifiers and the like through which the electric current enters and leaves an electrolytic bath.

It is commonly known that the terminals of apparatus of the character above designated become corroded, during use, at their points of emergence from the electrolyte into the air or other gases above the electrolyte. The rate of corrosion varies somewhat with different electrolytes, their chemical composition and their concentration. In time, the corrosion may reach such depth as to so weaken the electrode terminal as to cause it to break from its own weight or from jars or vibrations to which it may be subjected. Some electrolytes, which are electrically satisfactory, are not applicable to commercial use on account of rapid detoriation of the terminals employed in connection therewith. Other electrolytes, which are satisfactory at the outset, in a short time become so concentrated by evaporation that they attack and corrode the terminals.

Furthermore, this corrosion or incrustation of the terminals, particularly in electrolytic condensers, causes a serious current leakage and, consequently, a material watt loss.

I have discovered that corrosion of the terminals at the juncture of the electrolyte and the supernatant gas, and all salt formation upon the terminals at these points, together with the usual current leakage caused by corrosion, are obviated by screening off a portion of the electrolyte from the main body of the solution by means of sleeves electrically connected to the terminals, thereby maintaining substantially zero potential between the sleeves and the terminals.

The primary object of my invention resides, therefore, in the provision of a simple and effective means for preventing corrosion of the electrode terminals by retaining a portion of electrolyte, adjacent the surface thereof, between the terminals and sleeves connected thereto.

Another object of my invention is to provide an electrode terminal for condensers, rectifiers, lightning arresters and the like which shall obviate corrosion at the points where the terminals emerge from the electrolyte and thereby increase the length of continuous serve of such apparatus.

With these and other objects in view, my invention will be more fully described, illustrated in the drawings, in which corresponding numerals indicate like parts, and then particularly pointed out in the claims.

Figure 2:
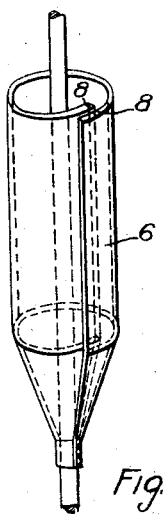

In the drawings, Figure 1 is a side view, partly in elevation and partly in section, of an ordinary electrolytic condenser to which my invention is applied, and Fig. 2 is a perspective view, on a larger scale, of a terminal constructed in accordance with my invention.

In order to insure a clear and accurate understanding of my invention, I have shown, in the drawing, an electrolytic condenser comprising a tank 1 formed of glass or other suitable material and an electrolyte 2 contained therein. Two series of suitable plates 3 of any desirable material such, for example, as aluminum, are alternately connected in the usual manner by terminals 4 which are preferably of similar material, the plates 3 having projecting portions 5 to which the terminals 4 are connected. At the points where the terminals 4 emerge from the electrolyte, sleeves 6 are positioned to surround them, each being connected to its terminal by having its end so restricted as to closely engage the same, as indicated at 7.

As shown in Fig. 2, the sleeve 6 may be formed by bending a suitably shaped blank of sheet metal to bring its opposite edges 8 into spaced overlapping relation and to contract one end of the substantially tubular body into frusto-conical form and an extremity of small and substantially uniform diameter. The sleeve thus provided may be conveniently applied to a terminal by causing the terminal to pass between the overlapping edges and the sleeve may then be both mechanically and electrically secured to the terminal by forcing its smaller end into frictional engagement therewith. The spaced overlapping edges 8 of the sleeve 6 permit access of electrolyte into the sleeve as well as facilitate the fastening of it to the terminal. Each sleeve may be connected to its respective terminal by constricting either of its ends but it is preferably connected at the end beneath the surface of the electrolyte, the other, or open end extending above the surface of the electrolyte.

Although the sleeves may be of any film-forming material, I have found that good results may be obtained by employing material similar to that utilized as the terminal. A non-film-forming material may be employed but, in such cases, waterproof coatings should be applied to the sleeves to prevent attack by the electrolyte with which they are in contact.

The corrosion of a terminal, embodying my invention, when applied to an electrolytic condenser or similar apparatus, is prevented by employing a sleeve, preferably of film-forming material, which may be replaced when corrosion has so affected it as to impair its efficiency. The sleeve, being connected to the terminal by frictional engagement, may be constructed of sufficient length to allow gradual withdrawal of the sleeve from the electrolyte as corrosion occurs and destroys its effectiveness at the point where it emerges from the electrolyte. In this manner, a sleeve may be practically entirely used up.

Corrosion of the terminal of the condenser is prevented on account of the fact that the sleeve is mechanically and electrically connected to the terminal and, therefore, the potential between the terminal and the surrounding sleeve is at all times substantially zero. The electrolyte immediately surrounding the terminal, being screened off from the main body of solution and being positioned between members of zero difference of potential, will not corrode the terminal, since there will be no current flow between the terminal and that portion of the electrolyte immediately surrounding it. However, sparkling and consequent corrosion will occur on the exterior of the sleeve surrounding the terminal at the surface where it emerges from the electrolyte. This corrosion of the terminal-projecting sleeve is exactly similar to that experienced with terminals not protected. Although the sleeve must be renewed at intervals, it may be made relatively inexpensive and may be constructed in such manner as not to require detachment of any parts of the condenser in order to replace it. Furthermore, approximately all of the material of the sleeve may be used up by gradually removing the sleeve from the electrolyte as it deteriorates.

It is obvious that, with minor changes in the construction and material, other forms of terminals for condensers, rectifiers and the like, may be constructed without departing from the spirit of my invention, and I desire, therefore, that no limitations shall be imposed except such as are indicated in the appended claims.

I claim as my invention:

1. A method of preventing corrosion of the terminal of an electrode of a condenser, rectifier, lightning arrester or the like that comprises interposing a sleeve of conducting material between the main body of electrolyte and the portion adjacent the terminal and connecting the sleeve to the terminal to maintain substantially zero difference of potential between the sleeve and the terminal.

2. A method of preventing corrosion of the terminal of an electrode of a condenser, rectifier, lightning arrester or the like that comprises interposing a split sleeve of conducting material between the main body of electrolyte and the portion adjacent the terminal and connecting the sleeve to the terminal to maintain substantially zero difference of potential between the sleeve and the terminal.

3. A method of preventing corrosion of the terminal of an electrode of a condenser, rectifier, lightning arrester or the like that comprises connecting a split aluminum sleeve to the terminal and interposing it between the main body of electrolyte and the portion adjacent the terminal.

4. In a condenser, rectifier, lightning arrester or the like, the combination with a container, an electrolyte therein and an electrode projecting from the electrolyte, of a conducting sleeve surrounding the terminal and connected to the terminal to establish substantially zero potential between the sleeve and the terminal.

5. In a condenser, rectifier, lightning arrester or the like, the combination with a container, an electrolyte therein and an electrode projecting from the electrolyte, of a split conducting sleeve surrounding the terminal adjacent the surface of the electrolyte and connected to the terminal to establish substantially zero potential between the sleeve and the terminal.

6. In a condenser, rectifier, lightning arrester or the like, the combination with a container, an electrolyte therein and an electrode projecting from the electrolyte, of a split sleeve of film-forming material surrounding the terminal adjacent the surface of the electrolyte and connected to the terminal to establish substantially zero potential between the sleeve and the terminal.

7. A terminal for electrolytic condensers, rectifiers, lightning arresters and the like comprising a conductor and a sleeve of conducting material engaging and surrounding the conductor.

8. A terminal for electrolytic condensers, rectifiers, lightning arresters and the like comprising a conductor and a split sleeve of material similar to the conductor engaging and surrounding the same.

9. A terminal for electrolytic condensers, rectifiers, lightning arresters and the like comprising a conductor and a split sleeve of conducting material engaging the conductor at one of its ends and surrounding the same.

10. A terminal for electrolytic condensers, rectifiers, lightning arresters and the like comprising a conductor and a split aluminum sleeve having a constricted end engaging the conductor.

11. A terminal for electrolytic condensers, rectifiers, lightning arresters and the like comprising a conductor and a split sleeve of film-forming material connected to the conductor and surrounding the same.

12. A method of preventing corrosion of the terminal of an electrode of a condenser, rectifier, lightning arrester or the like that comprises interposing a sleeve of film-forming material between the main body of electrolyte and the portion adjacent the terminal and connecting said sleeve to said terminal to maintain substantially zero potential between the sleeve and the terminal.

In testimony whereof I have hereunto subscribed my name this 27th day of Dec., 1918.

CHARLES LE G. FORTESCUE.